April 3, 1934.  S. W. HENNESSEY ET AL  1,953,756
ADVERTISING SIGN
Filed Nov. 18, 1933
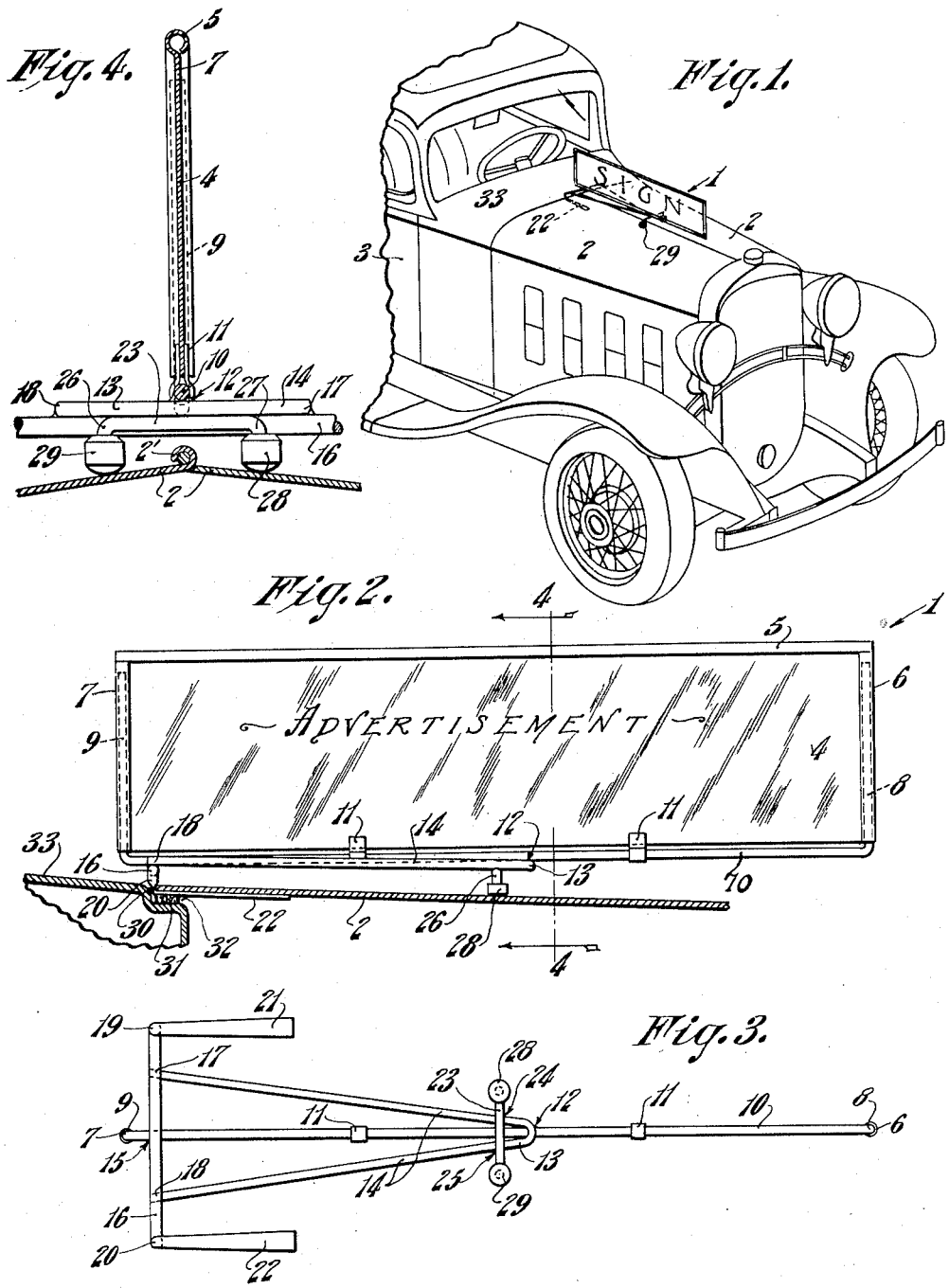
INVENTORS,
Stephen W. Hennessey,
Frederick W. Kartcheske,
BY Harry W. Bowen.
ATTORNEY.

Patented Apr. 3, 1934

1,953,756

UNITED STATES PATENT OFFICE 1,953,756

ADVERTISING SIGN

Stephen W. Hennessey and Frederick W. Kartcheske, Greenfield, Mass.; said Kartcheske, assignor to said Hennessey Application November 18, 1933, Serial No. 698,604

5 Claims. (Cl. 40—129)

Our invention relates to improvements in advertising signs, and more particularly to that type of sign intended to be detachably secured on the hood of a motor vehicle.

An object of our invention is to provide a sign of strong, rigid, construction, yet economical of labor and material, which may be quickly and easily attached to and detached from the hood of an automobile.

A further object of our invention is to provide such a sign adapted to be secured at one end only of an automobile hood, thereby providing a standard construction which may be used with all lengths and types of hoods.

A still further object of our invention is to provide, in such a sign, transverse bracing means for resisting wind pressure and for holding the sign rigidly in position under all normal conditions.

These, and other objects and advantages of our invention, will be more completely described and disclosed in the specification, the accompanying drawing, and the appended claims.

Broadly, our invention comprises a frame member having a plurality of foot members adapted to grip the under side of an automobile hood adjacent the cowl, and other foot members adapted to rest on the upper surface of the hood, integral transverse brace members connecting the two sets of foot members, a U-shaped sign frame member welded, or otherwise, secured to the brace members and the foot members, and a flat metallic sign secured to the U-shaped frame member.

A preferred embodiment of our invention is illustrated in the accompanying drawing, in which:—

Fig. 1 is a partial, perspective view of an automobile with the sign secured on the automobile hood.

Fig. 2 is a partial, sectional view through the cowl and hood, showing the sign in place on the hood.

Fig. 3 is an underside, plan view of the sign frame, and

Fig. 4 is a cross, sectional view, taken on the line 4—4 of Fig. 2.

Referring now to the drawing in detail, in which like numerals refer to like parts throughout:—

The sign 1 is removably secured in position on the hood 2 of an automobile 3, as indicated in Fig. 1.

A metallic sign plate 4 is formed with a rolled, top edge 5 and rolled ends 6 and 7. The rolled end portions 6 and 7 are folded around and secured on upwardly extending arms 8 and 9, respectively, of a U-shaped sign frame member 10. Clips 11, secured on the member 10 and extending upwardly on the opposite sides of the plate member 4, are secured to the plate 4 by spot welding, or other suitable means. The U-shaped sign frame member 10 is welded, or otherwise secured at 12 to the apex 13 of a transverse V-shaped brace member 14, and at 15 to a transverse foot, or clamping member 16. The extreme rear ends 17 and 18 of the brace members 14 are also welded to the member 16. The member 16 is formed with the downwardly extending portions 19 and 20, which are flattened and bent outwardly into a plane, approximately parallel to the brace 14, to form the clamping members, or feet 21 and 22. A transverse foot member 23, welded, or otherwise secured, on the under side of the brace members 14, at 24 and 25, has secured on the extremities 26 and 27 thereof, the pads 28 and 29 of a soft, resilient material, such as live rubber.

The metallic sign 1 is installed on the hood 2, as illustrated in Fig. 2. The portions 21 and 22 of the tranverse member 16 are slipped under the rear edge 30 of the hood 2, with the edge 30, bearing against the downwardly extending portions 19 and 20. The portions 21 and 22 rest on the packing member 31, in the rabbet 32 of the automobile cowl 33, and bear against the under side of the hood 2. The rubber pads 28 and 29 straddle the hood hinge 2' and bear on the upper surface of the hood 2. Thus, the hood 2 is firmly gripped between the members 21 and 22, bearing on the under side and the rubber pads 28 and 29 bearing on the upper side. The resilient pads 28 and 29 grip the surface of the hood, without marking, or scratching the finish. The brace members 14 hold the sign against transverse strains, and aid materially in eliminating vibration and rattling.

There is normally sufficient play between the hood and cowl to permit the flat members 21 and 22 to be inserted and removed, without disturbing the fasteners of the hood, so that the signs may be readily changed, installed, or removed, without the aid of tools of any kind.

Whereas, we have shown and described our invention as used in co-operation with the hood of an automobile, we do not limit ourselves to this use, as it will be readily understood by one skilled in the art, that such a sign may be as easily installed on the end of a shelf, a table, or bench, or any object so formed, as to provide a shelf-like portion on which the members 21, 22, 28 and 29 may bear.

What we claim is:—

1. A removable advertising sign device for location on the hood of a motor vehicle comprising, a plate member on which the advertising matter is displayed, means for removably securing the device to the hood comprising a transverse bar secured to the plate, foot-like members secured to the bar and designed to be inserted under the rear end of the hood, pad members attached to the plate for location on the upper surface of the hood to provide a lateral support for the sign device.

2. A sign device comprising, a plate member, a transverse bar secured to the rear end of the plate member and formed with depending portions at the ends of the bar that extend forwardly therefrom for insertion under the rear end of the hood, a V-shaped brace member secured to the transverse bar, the apex part of said brace being attached to the lower edge of the sign device, a transverse bar secured to the V-shaped member having depending end portions, and cushion pads on the end portions.

3. A removable sign device for location on the hood of a motor vehicle comprising, a plate member, a U-shaped rod to which the plate member is secured, a bar secured near the rear end of said rod and formed with flattened forwardly extending end portions, a brace member connected to the bar at one end and to the U-shaped rod at its other end, a transverse rod secured to the brace member having depending end portions, the construction and arrangement being such that the bar near its rear end will engage the rear upper edge of the hood when the said flattened end portions are located under the hood and the depending end portions of the transverse rod will engage the top of the hood, as described.

4. A sign construction comprising, a plate member, means for removably securing the member to a motor vehicle hood comprising, a bar with flattened laterally spaced members, a brace bar connected to the bar and to the lower edge of the plate near its mid-length point, and a bar secured to the front end of the brace and having pad portions thereon.

5. A sign construction comprising, a plate member, means for removably securing the member to a motor vehicle hood comprising a bar with flattened laterally spaced members, a brace bar connected to the bar and to the lower edge of the plate near its mid-length point, and a bar secured to the front end of the brace and having pad portions thereon, the bar with spaced flattened ends being designed for insertion under the upper rear end of the hood and the pad portions for engagement with the upper surface of the head, as described.

STEPHEN W. HENNESSEY.
FREDERICK W. KARTCHESKE.